United States Patent
Mastrianni et al.

(10) Patent No.: US 6,922,488 B2
(45) Date of Patent: Jul. 26, 2005

(54) METHOD AND SYSTEM FOR PROVIDING APPLICATION LAUNCH BY IDENTIFYING A USER VIA A DIGITAL CAMERA, UTILIZING AN EDGE DETECTION ALGORITHM

(75) Inventors: Steven J. Mastrianni, Unionville, CT (US); Mitchell Jay Stein, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 09/784,912

(22) Filed: Feb. 16, 2001

(65) Prior Publication Data

US 2002/0114519 A1 Aug. 22, 2002

(51) Int. Cl.[7] .............................. G06K 9/48; G04L 9/00; G04K 1/00
(52) U.S. Cl. ....................... 382/199; 713/182; 713/186; 713/200; 713/202; 713/168; 713/169; 713/170; 705/67
(58) Field of Search ................................. 382/199, 115, 382/118; 707/6, 9; 713/168–170, 182–186, 200–202; 345/751–752, 728, 729, 734, 863, 750; 705/51–79; 340/5.52, 5.53, 5.54, 5.2, 5.61, 5.8, 5.81, 5.82, 5.83

(56) References Cited

U.S. PATENT DOCUMENTS

| | | | | |
|---|---|---|---|---|
| 5,771,354 A | * | 6/1998 | Crawford | 709/229 |
| 6,111,950 A | * | 8/2000 | Fredlund et al. | 713/186 |
| 6,157,435 A | * | 12/2000 | Slater et al. | 355/40 |
| 6,226,406 B1 | * | 5/2001 | Hsieh | 382/209 |
| 6,275,601 B1 | * | 8/2001 | Yamaguchi et al. | 382/124 |
| 6,295,391 B1 | * | 9/2001 | Rudd et al. | 382/313 |
| 6,301,388 B1 | * | 10/2001 | Hiramoto | 382/218 |
| 6,320,973 B2 | * | 11/2001 | Suzaki et al. | 382/110 |
| 6,330,676 B1 | * | 12/2001 | Kelsey | 713/200 |
| 6,373,047 B1 | * | 4/2002 | Adan et al. | 250/221 |
| 6,519,607 B1 | * | 2/2003 | Mahoney et al. | 707/104.1 |
| 6,546,123 B1 | * | 4/2003 | McLaren et al. | 382/128 |
| 6,560,711 B1 | * | 5/2003 | Given et al. | 713/200 |
| 6,609,199 B1 | * | 8/2003 | DeTreville | 713/172 |
| 6,658,145 B1 | * | 12/2003 | Silver et al. | 382/149 |

* cited by examiner

*Primary Examiner*—Samir Ahmed
*Assistant Examiner*—Brian Le
(74) *Attorney, Agent, or Firm*—Scully, Scott, Murphy & Presser; Louis P. Herzberg

(57) ABSTRACT

According the present invention, there is provided a method and system for automatically launching an application in a computing device (e.g. Internet appliance, or the like) by authenticating a user via a digital camera in the computing device, comprising: obtaining a digital representation of the user via the digital camera; filtering the digital representation with an digital edge detection algorithm to produce a resulting digital image; comparing the resulting digital image to a pre-stored digital image of the user; retrieving user information including an application to be launched in response to a successful comparison result, the user information being associated with the pre-stored digital image of the user; and launching the application.

36 Claims, 7 Drawing Sheets

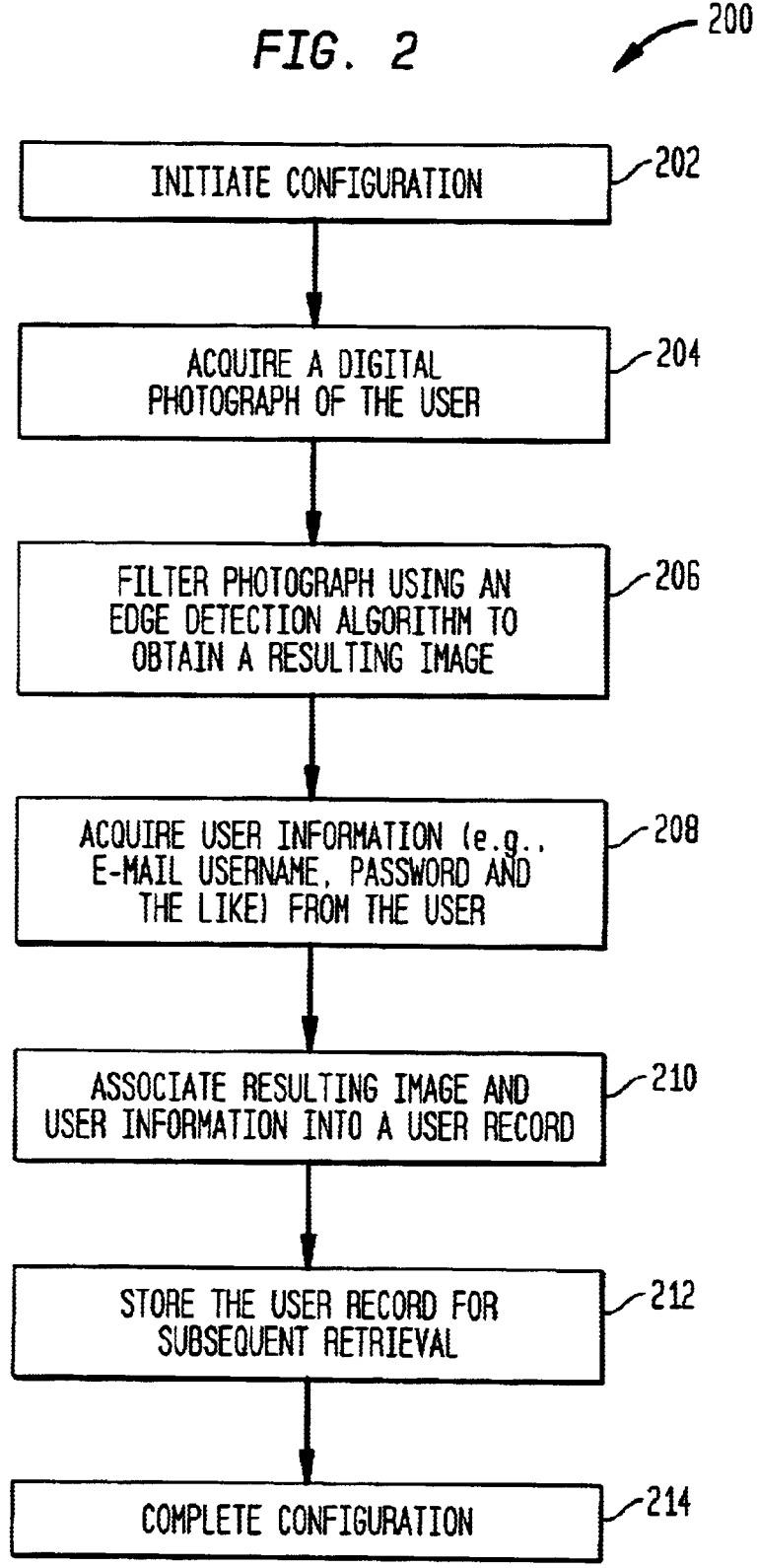

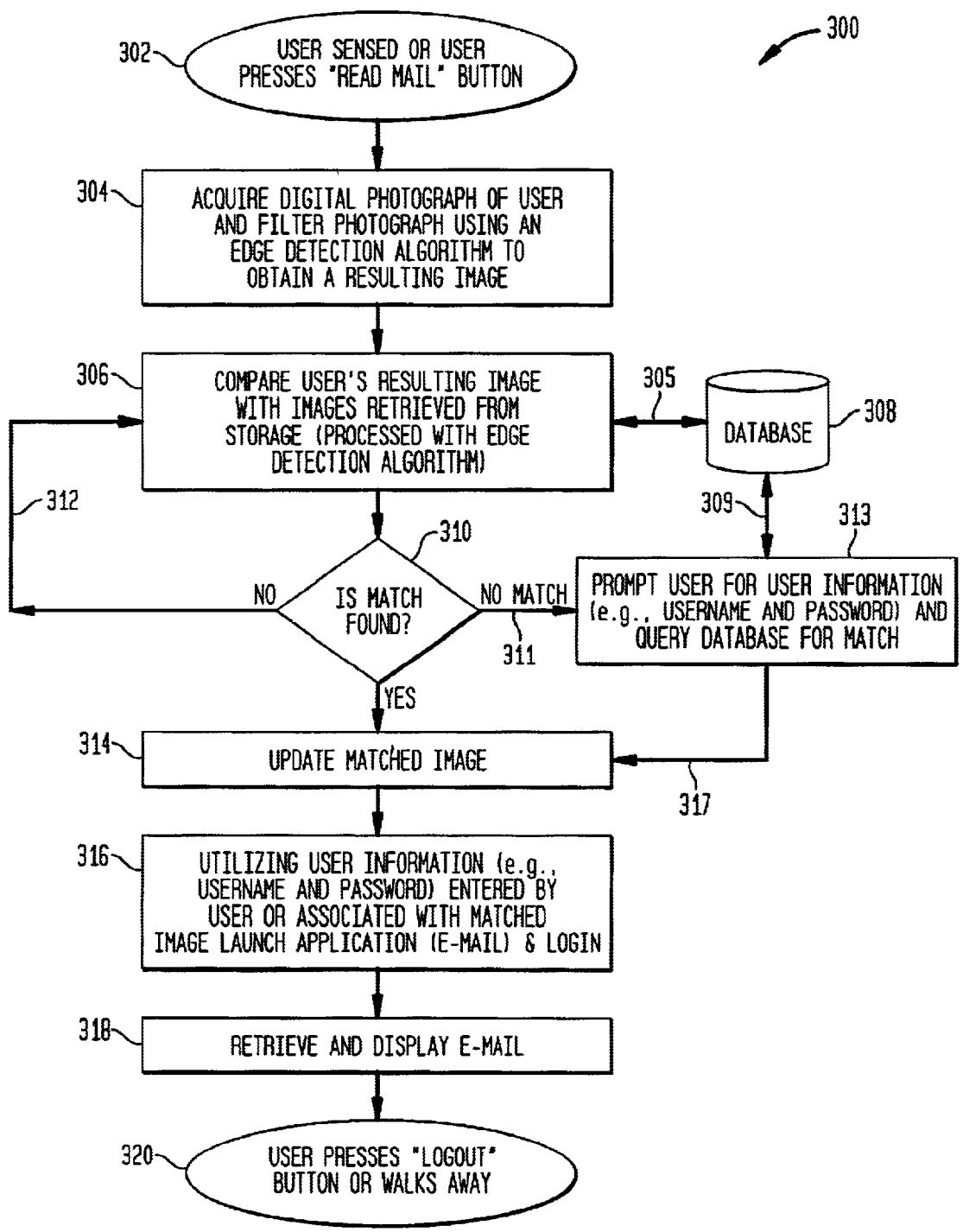

TO FIG. 4B

FROM FIG. 4A

OPENS ARE '0'. BLACK SQUARES ARE '1'

"●" REPRESENT MARGIN OF ERROR FACTOR

X = ADDED BY LEAST SQUARES

METHOD AND SYSTEM FOR PROVIDING APPLICATION LAUNCH BY IDENTIFYING A USER VIA A DIGITAL CAMERA, UTILIZING AN EDGE DETECTION ALGORITHM

BACKGROUND OF THE INVENTION

1. Technical Field of the Invention

The present invention generally relates to interaction of a user with a personal computer, and more particularly to a method and system for launching applications (e.g., e-mail client) and accessing data associated therewith (e.g., e-mail) by identifying a user via a digital camera, utilizing an edge-detection algorithm.

2. Description of the Related Art

People interface with other people by words and vocal inflections, by subtle bodily movements and nuances of gaze, by touch and gesture, and even by uncontrollable reactions like blushing or falling speechless. In contrast, people interface with personal computers via two primary interfaces: a keyboard and a pointing device (e.g., a mouse). However, the primary interfaces often provide for tedious, even sometimes difficult and time-consuming interaction between people and personal computers. Furthermore, although personal computers have become less expensive and yet more powerful, they still remain difficult to use.

A personal computer's icon-oriented desktop and user interfaces coupled with primary interfaces described above have changed little in the last several decades. Attempts to make personal computers easier to use have focused around the foregoing desktop, user interfaces and primary interfaces. For the most part, developers have concentrated on making personal computers easier to use by changing the foregoing interfaces (i.e., both user interfaces and primary interfaces) rather than changing an entire paradigm for interfacing people (i.e., users) with personal computers. In other words, developers have tried the make the foregoing interfaces provide better and easier interactivity between users and personal computer, but have failed to look "outside the box" for alternative methods of user interaction with personal computers.

However, alternative methods of user interaction with personal computers have been attempted. Some developers have examined using infrared motion sensors to identify movement of a person in proximity to a personal computer, and more specifically, have examined a rate of such movement (slew rate). Other developers have examined using a human emotion as input to a personal computer by utilizing visual techniques that analyze facial expressions, where the computer can be programmed to provide correct responses to queries or even provide prompts or proactive conversation with the user based on the use's emotional states. For example, if the user is determined to be depressed, the personal computer could ask, "What's wrong?" or even discuss the determined problem. Still other developers have examined using retinal imaging and position of a pupil in a human eye to guide a pointing device or a text cursor by following a movement of the eye.

Still further, biometrics has been a burgeoning field directed to studying measurable biological and physiological characteristics of a person. In computer technology, biometrics has been used for authentication techniques that rely on measurable biological and physiological characteristics that can automatically be checked or verified by a computer. More particularly, biometrics has been used for fingerprint identification, retinal and hand scanning, face and voice recognition, and the like. Computer technology implementing biometric devices (e.g., particularly for facial recognition) has focused upon nearly exact identification (i.e., small margin of error) of a person from within a very large group or population, using sophisticated highly priced equipment and algorithms. Such sophistication and expense are warranted for use in security, law enforcement, and corporate identification systems. That is, the technology implementing biometric devices necessarily requires highly priced equipment capable of exact measurements within a very small margin of error, which in turn require complex algorithms, tremendous computing power, and proprietary software development for the algorithms.

Conventional computer technology for determining an identity of a computer user for accessing e-mail and launching applications requires a personal computer to provide some form of rudimentary authentication using a logon mechanism, which generally consists of a username and a password. As described above, computer technology implementing biometric devices for facial recognition has focused upon a nearly exact identification of a person from within a very large population, thereby requiring sophisticated high-priced equipment and algorithms. The algorithms used by this equipment (e.g., video or photographic imaging and thermography) require powerful machines, with fast processors and substantial amount of memory (e.g., both volatile and non-volatile). The foregoing sophisticated and costly technology is cost-prohibitive for low-cost computing devices (e.g., Internet appliances), desktop and notebook personal computers. Additionally, the foregoing hardware requirements prevent such sophisticated equipment from being used on smaller and less-powerful computing devices (e.g., Internet appliance), and low-cost desktop and notebook personal computers.

Edge detection algorithms are known in the art and are generally used for: 1) detecting or identifying parts or components on a conveyor belt; 2) identifying or selecting elements or objects from certain types of backgrounds; and/or 3) converging multiple images into a mosaic image. Edge detection is generally grouped into two categories: 1) gradient filter (e.g., Sobel filter); and 2) Laplacian filter (and/or Gaussian filter). One skilled in the art will readily appreciate that the gradient filter detects edges by identifying intensities in first-order derivatives in horizontal and vertical directions (i.e., X, Y directions) of an image, while the Laplacian filter detects edges by identifying zero crossings in second-order derivatives of the image. Additionally, one skilled in the art understands that the Laplacian filter is more sensitive than the Sobel filter for identifying edges, but is more sensitive to noise. One skilled in the art with readily appreciate that heretofore the foregoing algorithms have not been used in a computing device for launching applications (e.g., e-mail client) and accessing data associated therewith (e.g., e-mail) by determining an identity of a computer user based on the edge detection algorithms.

Considering the foregoing, it is very desirable to provide a method and system for determining the identity of the computer user for launching applications and accessing data associated therewith (e.g., launching e-mail client and retrieving e-mail associated therewith) via a digital camera, using an edge-detection algorithm, such that the method and system are not cost-prohibitive and can easily and cost-effectively be employed in an computing device (e.g., Internet device) having the ability to easily differentiate among household members or members of a small-sized organization (i.e., users).

SUMMARY OF THE INVENTION

It is therefore an object of the present invention to provide a method and system for determining an identity of a computer user via a digital camera, utilizing an edge-detection algorithm and for automatically launching an application after a successful identification of the user.

It is another object of the present invention to provide a method and system for cost-effectively identifying computer users of a household or a small-sized organization.

It is a further object of the present invention to provide a method and system for launching an e-mail client by identifying a user via a digital camera, using an edge-detection algorithm.

It is yet a further object of the present invention to provide a method and system for utilizing an identity of a computer user to access e-mail associated with the e-mail client.

As described hereinabove, most face recognition software have focused upon an almost-exact identification of a person from within a very large group or population (i.e., fine granularity), thereby requiring sophisticated and high-priced equipment. Coincident with this sophistication, most face recognition software that are utilized on this equipment invariably require fast processor(s), large non-volatile storage (e.g., hardisk(s), laser disk and the like) and a large random access memory ("RAM"). On the contrary, the present invention is intended to run on a low-powered low-cost computing device or computer. Furthermore, the computing device of the present invention is intended for identification of members of a typical household and/or a small-sized organization (e.g., about 50 members) (i.e., course granularity). Based on the foregoing requirements, the computing device according to the present invention utilizes an edge detection algorithm (e.g., gradient filter), using a Sobel or similar filter, and preferably applies a Laplacian filter (or Gaussian filter) to the outcome of the Sobel filter to derive more accurate edge detection.

Thus according to an embodiment of the present invention, there is provided a method for automatically launching an application in a computing device by authenticating a user via a digital camera in the computing device, the method comprising: obtaining a digital representation of the user via the digital camera; filtering the digital representation with an edge detection algorithm to produce a resulting digital image; comparing the resulting digital image to a pre-stored digital image of the user; and launching the application in response to a successful match of the user.

According to another embodiment of the present invention, there is provided a system for automatically launching an application in a computing device by authenticating a user via a digital camera in the computing device, the method comprising: a mechanism for obtaining a digital representation of the user via the digital camera; a mechanism for filtering the digital representation with an digital edge detection algorithm to produce a resulting digital image; a mechanism for comparing the resulting digital image to a prestored digital image of the user; and a mechanism for launching the application in response to a successful match of the user.

According to yet another embodiment of the present invention, there is provided a program storage device readable by a machine, tangibly embodying a program of instructions, executable by the machine to perform method steps for automatically launching an application in a computing device by authenticating a user via a digital camera in the computing device, the method steps comprising: obtaining a digital representation of the user via the digital camera; filtering the digital representation with an digital edge detection algorithm to produce a resulting digital image; comparing the resulting digital image to a pre-stored digital image of the user; and launching the application in response to a successful match of the user.

BRIEF DESCRIPTION OF THE DRAWINGS

The objects, features and advantages of the present invention will become apparent to one skilled in the art, in view of the following detailed description taken in combination with the attached drawings, in which:

FIG. 2 is an exemplary illustration of a sequence of steps for configuring the present invention for a particular user according to the present invention.

FIG. 3 is an exemplary illustration of a sequence of steps for retrieving e-mail according to the present the invention.

DETAILED DESCRIPTION OF THE PREFERRED EMBODIMENT OF THE PRESENT INVENTION

The present invention is directed to a method and system for launching applications and accessing data associated therewith by identifying a user via a digital camera, using an edge-detection algorithm. As will be described hereinafter, an exemplary type of an application may be an e-mail application, whereby a user's e-mail may automatically be retrieved and displayed to the user upon successful identification of the user.

Figure 1:
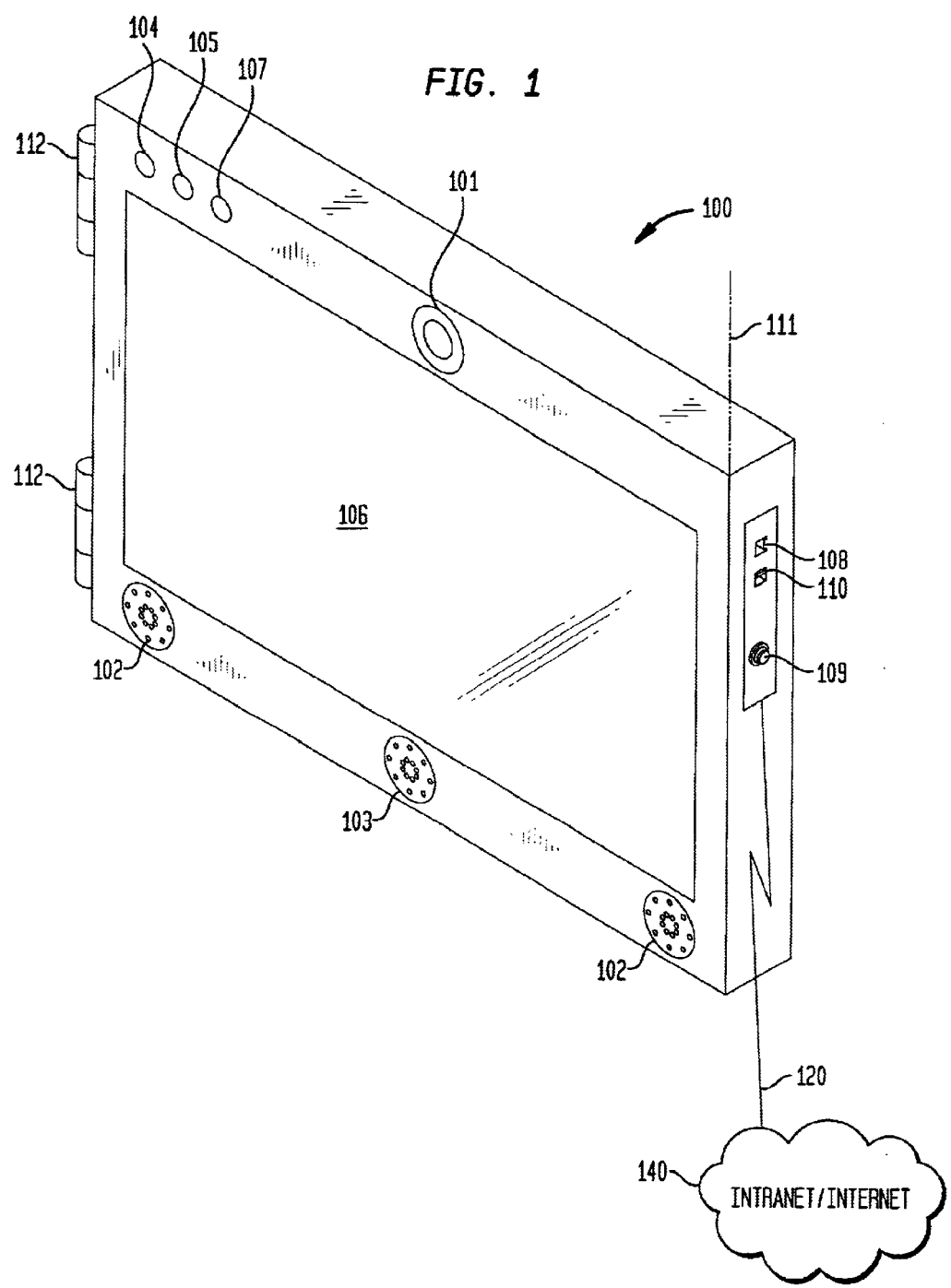
FIG. 1 is an exemplary illustration of an computing device according to the present invention.

FIG. 1 is an exemplary illustration of computing device 100 according to the present invention, upon which the method according to present invention may be practiced. Now referring to FIG. 1, computing device 100 (e.g., Internet appliance, personal computer, and the like) is installed at a location that provides line-of-sight access to computing device 100 at a distance not exceeding a depth of field of digital camera 101 of FIG. 1. Preferably, computing device 100 may be flush-mounted to a wall or a door via wall/door mount 111, and have hinges 112 for rotating computing device 100 at various angles relative to a user. Furthermore, computing device 100 may be incorporated into a household appliance (e.g., refrigerator, stove, and the like), a business appliance (e.g., security device on entrance door), or a portable device (e.g., a laptop computer, a personal digital assistant, and the like). Computing device 100 also has a power LED 104, an e-mail LED 105 and a connection LED 107 for indicating various operational states. Computing device 100 may have no exposed primary interfaces (e.g., keyboard or mouse) and may rely on a touch screen display 106, speakers 102, microphone 103, digital camera 101, network connection 108, telephone connection 110 and antenna connection 109, or any combination thereof for input and output functionality. Computing device 100 may contain an operating system such as Windows 95® or greater, Windows NT®, or Linux® and appropriate hardware adapters for connecting the computing device 100 to a network 140. For example, computing device 100 may utilize a conventional modem or a direct subscriber line ("DSL") modem connected to phone line 110, a cable modem connected antenna connector 109, and a token-ring or an Ethernet connected to network connector 108, for connecting to network (e.g., Intranet/Internet) 140. It is to be noted that although an exemplary connection 120 is depicted for connecting the computing device via the hardware adapters to network 140, a skilled artisan will immediately ascertain that there may be additional connections other than connection 120 for connecting computing device 100 to network 140.

Computing device 100 also includes appropriate software drivers and communication protocols for enabling computing device 100 to communicate over network 140. Preferably, computing device 100 includes a transmission control protocol/Internet protocol ("TCP/IP") for connecting to hosts over network 140. In addition, computing device 100 includes software applications for managing routine information management tasks. These applications may include a web browser, a telephone dialer and an e-mail client. The web browser can be any conventional browser, exemplified by Netscape Navigator® or Microsoft's Internet Explorer®. Any conventional dialer may be included, such as the AT&T's Global network dialer. A conventional e-mail client may include Lotus Notes®, Microsoft Outlook®, or Eudora®. Furthermore, the e-mail client may utilize a post office protocol ("POP"), an Internet Message Access Protocol ("IMAP"), a Simple Mail Transfer Protocol ("SMTP"), and the like, for e-mail communications.

According to the present invention, a user may utilize computing device 100 to compose, send and receive electronic mail (e-mail) over network 140 and to display the e-mail over touch screen display 106, or to launch a selected application (e.g., based on user profile). Selected applications may be launched automatically by computing device 100, as configured by the user (described herein with respect to FIG. 2), upon successful authentication of the user (described herein with respect to FIG. 3). Computing device 100 may also be used to view Internet Web pages via any conventional Web browser, such as described hereinabove. Interaction between the user and computing device 100 is enabled via touch screen display 106. Computing device 100 may further include conventional interaction devices for interaction between the user and the computing device 100, such as a keyboard (not shown) and pointing device (not shown).

FIG. 2 illustrates a sequence of steps 200 for configuring computing device 100 to automatically launch an application for a particular user according to the present invention. At step 202, configuration of the computing device 100 for the user is initiated. In operation, computing device 100 senses that a person is situated in front of computing device 100. Thus, for example, the user may simply stand in a line-of-sight of computing device 100 (i.e., alignment as described herein below) until the computing device 100 senses the user, e.g., approximately 0.5 seconds. Alternatively, the user may interact with computing device 100 by pressing a configuration button (not shown) on touch screen display 106 for initiating configuration at step 202. After sensing the user or interacting with the user, computing device 100 at step 204 acquires a digital photograph (i.e., digital representation) of the user by utilizing digital camera 101 of FIG. 1.

Figure 4A:
FIG. 4 is an exemplary illustration of a resulting image obtained from filtering a digital photograph of a user, as described with respect to FIGS. 2 and 3.
Figure 8:
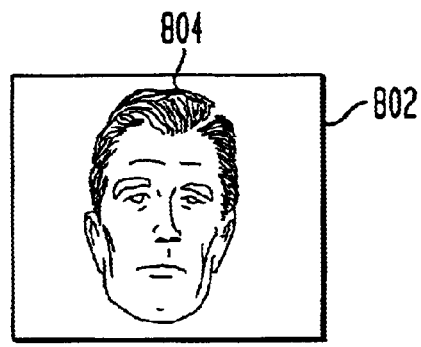
FIGS. 8–10 are exemplary illustrations of alignment and centering of a resulting image according to the present invention.
Figure 9:
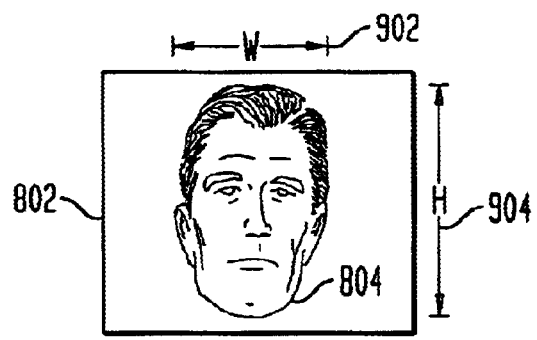
Figure 10:
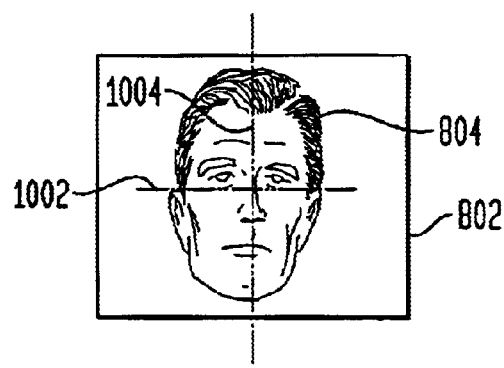

With reference to acquiring the digital photograph of the user according to FIG. 2, alignment of the user with respect to computing device 100 is preferably obtained by giving feedback to the user with regard to the user's position in relation to computing device 100. That is, when the user is situated in front of computing device 100, a picture of the user is obtained via camera 101 and displayed to the user on touch screen display 106. The picture is displayed within a frame representing correct alignment, and the user must step forward, backward, left or right until the user's face fits precisely into the displayed frame. Alternatively, a combination of LEDs may be employed to achieve the alignment of the user to computing device 100. For example, a linear horizontal and/or vertical configuration of 3 or more LEDs, such as Red-Green-Red (i.e., a Red for each direction and Green for correct alignment), can be provided on computing device 100. That is, when the user moves the user's head too far left, right, up or down, a corresponding Red LED is illuminated and flashes, letting the user know the user has gone too far in that direction. Once the user successfully finds a precise position in line-of-sight of computing device 100, a Green LED is illuminated. Preferably, digital camera 101 acquires a low-resolution digital image of the user, i.e., since resources available in computing device 100 may be limited. At step 206, the digital photograph of the user thus acquired is then filtered using an edge detection algorithm (e.g., gradient filter), thereby obtaining a resulting image, which represents a binary matrix (described herein below with reference to FIG. 4). Preferably, the resulting image is centered with respect to the frame as illustrated in FIGS. 8–10. As an example, in FIG. 8, resulting image 804 is aligned left of frame 802. Initially, resulting image 804 is measured in a horizontal direction (i.e., Width—"W") 902 and vertical direction (i.e., Height—"H") 904, as shown in FIG. 9. Furthermore, in FIG. 10, the resulting image 804 is centered using its maximum vertical and horizontal edges. That is, centering is accomplished by taking a mean of width 902 and height 904 of resulting image 804 (i.e., binary matrix) and centering the resulting image at its center (i.e., intersection of elements 1002 and 1004) within frame 802 by shifting the binary matrix up, down, left or right until center of the binary matrix is equal to a center of the frame.

Additionally with reference to FIG. 2, it should be noted that the resulting image may further be advantageously filtered using a Laplacian and/or Gaussian filter for improved detection of edges, as described herein. Subsequently, at step 208 of FIG. 2, computing device 100 acquires user information, e.g., user's e-mail address, username and password, and the like (e.g., first and last name of the user). Additionally, user information may include a user's profile, e.g., programs that the user desires to be launched upon successful authentication according to FIG. 3. It should be noted that an application such as a conventional e-mail client (described hereinabove with regard to FIG. 1) may be utilized for receiving e-mail addressed to the user's email address and may be input as part of the user's profile at this step. The foregoing user information may preferably be input by the user via touch screen display 106, or alternatively via a conventional input device (e.g., keyboard or pointing device) that may be provided for computing device 100. Lastly, the image resulting from the edge detection is associated or linked with the user's information at step 210 to form a user record and the user record including the associated resulting image and user's information is stored for subsequent retrieval at step 212. Preferably, the user record is stored in a non-volatile memory (e.g., hard disk or laser disk) for later retrieval. Additionally, it is preferable that the user record is stored in a database. At step 214, configuration for the user is completed. It should be noted that the stored resulting mage is used for subsequent identification of the user by comparing the stored resulting mage with a new resulting image of the user, which is obtained by filtering a newly acquired digital photograph (i.e., digital representation) of the user with the edge detection algorithm, as particularly described herein below.

FIG. 3 illustrates a sequence of steps 300 for retrieving e-mail according to the present invention. Now referring to FIG. 3, when a user desires to retrieve e-mail, the user steps in front of computing device 100 of FIG. 1. As described hereinabove, computing device 100 preferably is enabled to take a photograph of a user upon sensing that the user is situated in front of computing device 100, and is in alignment therewith as described herein in greater detail. Thus, at step 302 the user simply stands in front of computing device 100 until the computing device 100 senses the user (e.g., for approximately 0.5 seconds) or otherwise the user interacts with computing device 100 as described herein. Alternatively to sensing the user, at step 302 the user interacts with computing device 100 via a user interface or primary interfaces described hereinabove. For example, the user presses a "Read Mail" button on touch screen display 106 for retrieving the user's e-mail and stands in front of computing device 100 for aligning the user to computing device as described herein above with reference to FIG. 2 and for acquiring user's photograph as described hereinafter. At step 304 of FIG. 3, computing device 100 via digital camera 101 acquires a digital photograph of the user thus sensed by or interacted to computing device 100 and aligned thereto, and filters the digital photograph of the user using an edge detection algorithm (e.g., gradient filter), thereby obtaining a resulting image. As described above, it is preferable to further apply a Laplacian or Gaussian filter to obtain a clearer resulting image. At step 306, the image resulting from the edge detection is compared against each of a plurality of pre-stored images of users retrieved at step 305 from database 308, as particularly described with reference to FIGS. 4–6. It should be noted the resulting image as well as the plurality of pre-stored images are binary matrix representations of edge-detected photographs of users. As such, comparison between a matrix of the resulting image and a matrix of the pre-stored image can advantageously be performed with Boolean operators, such as "AND" and "OR" Boolean operators. Utilizing Boolean comparisons provides for very fast and efficient comparisons, whereas non-Boolean comparison algorithms tend to consume a lot of processing power and take a comparatively long time for determining a match. The comparison between the resulting image and the pre-stored image will be described in greater detail herein below with reference to FIGS. 4–6.

Further referring to FIG. 3, if a match is not found at step 310 and there remain additional pre-stored images to compare at step 312, computing device 100 continues to compare pre-stored images stored in database 308 against the resulting image until a match is found at step 314, or until no match is found at step 311 after exhausting pre-stored images. If no match is found at step 311 (e.g., computing device previously configured for the user), computing device 100 preferably prompts the user at step 313 to enter the user's information (e.g., user name and password, or the like) using the keyboard interface (not shown) or touch screen 106 of FIG. 1. Using this information, at step 309 database 308 is queried for a match and if a successful match is found at step 317, pre-stored image for the user is updated with the resulting image at step 315, as described herein below with reference to FIGS. 5–7. Querying is preferably performed using case-sensitive string comparison. Alternatively, if computing device 100 has not been configured for the user, the user may be prompted to proceed with configuration of computing device 100, as particularly illustrated in FIG. 2. Furthermore, if a successful match between the resulting image and one of plurality of pre-stored images is found at step 310, computing device 100 utilizes the user's username and password included in the stored user record associated with the matched image to automatically launch an e-mail client and login the user at step 316. The e-mail client may be launched or executed by computing device 100 via an operating system call with username and password being passed as command line arguments. Alternatively, computing device 100 may launch the e-mail client using an object interface, wherein computing device 100 instantiates an e-mail object and invokes a method on the e-mail object passing username and password as arguments. Additionally, computing device 100 may further require the user to confirm the successful match by verifying user information associated with pre-stored information associated with the matching image.

Furthermore with reference to FIG. 3, computing device 100 is optionally enabled to perform merging of a pre-stored image with a resulting image of the user into a composite image for future comparisons. That is, at step 314 of FIG. 3, computing device 100 updates the matched image (i.e., pre-stored image) with the resulting image by merging the images together to form a new composite image, which replaces the matched image for the user in database 308 and is the one utilized for subsequent image comparisons. In operation, computing device 100 updates the pre-stored image of the user by noting differences between the resulting image and the matching pre-stored image within database 308 and replacing the pre-stored image with an arithmetical mean of the two images. This feature advantageously keeps an up-to-date edge-detected image for the user, whose facial features may change over time (e.g., growing hair). A sequence of steps required for merging images will be described with reference to FIGS. 5–7 herein below.

Further referring to FIG. 3, at step 318 for the instance of automatic application launch of an e-mail client, e-mail for the user is retrieved and displayed to the user via touch screen display 106 of FIG. 1. It should be noted that the user interacts with computing device 100 via touch screen display 100 or primary interfaces described hereinabove (e.g., keyboard and mouse) to select and display e-mail. At step 320, to logout the user interacts with computing device 100 via touch screen display 106 or the primary interfaces, or the user simply walks away from computing device 100. If the user chooses to walk away at step 320, computing device 100 senses that no interaction between user and computing device 100 has occurred for a predetermined time (e.g., approximately a 1 minute time interval) and automatically logs out the user.

Figure 4B:
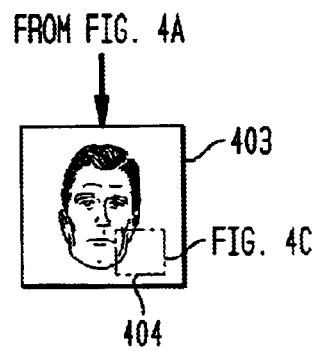
Figure 4C:
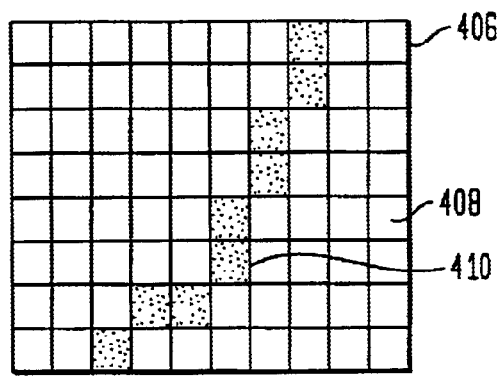

FIGS. 4(*a*)–(*c*) are exemplary illustrations of an image resulting from filtering a digital photograph of a user, as described with respect to FIGS. 2 and 3. A digital photograph of the user acquired for configuration in FIG. 2 or for comparison in FIG. 3, is filtered utilizing edge detection algorithm(s) described hereinabove. FIG. 4(*a*) illustrates resulting image 402 of a digital photograph of a user after filtering with edge detection algorithm(s), which is a binary matrix of a size determined by a resolution 403 of digital camera 101 of FIG. 1. A resolution of 100 by 100 pixels is a preferred resolution for digital camera 101 of FIG. 1. However, depending upon particular requirements and computing power of computing device 100 a higher resolution digital camera may be utilized. To illustrate the binary matrix, section 404 of FIG. 4(*b*) depicts a section of resulting image 402 of FIG. 4(*a*). FIG. 4(*c*) illustrates a matrix 406 that is a magnification for section 404 of resulting image 402, where filled squares 410 represent portions of edges (i.e., illustrated by "1" bit), while open squares do not represent portions of edges (i.e., illustrated by "0" bit).

Figure 5:
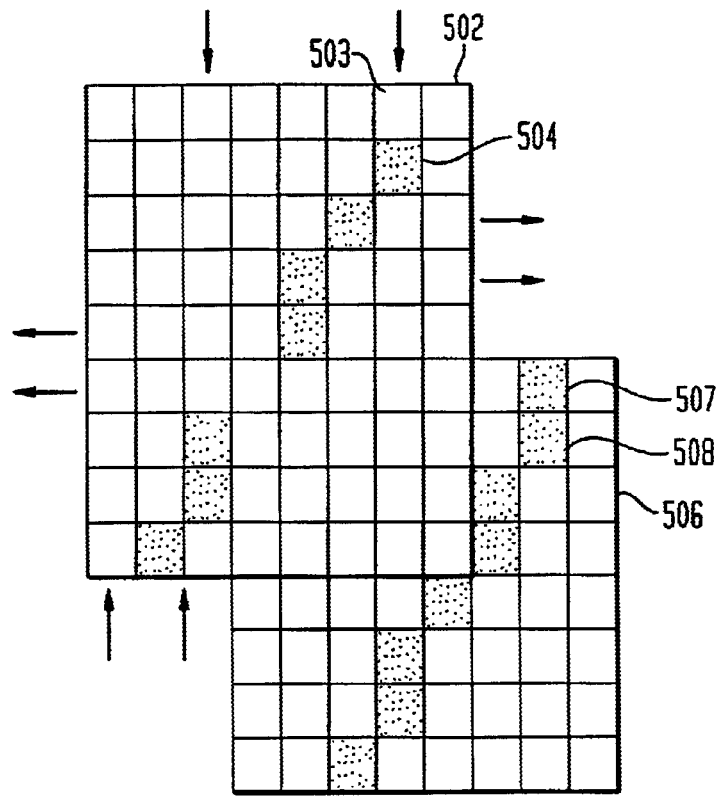
FIGS. 5–7 are exemplary illustrations of a sequence of steps performed for merging a resulting image and a pre-stored image of the user into a composite image.
Figure 6:
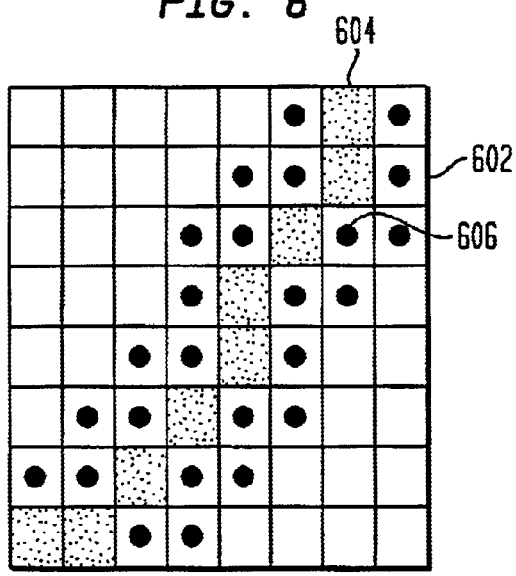
Figure 7:
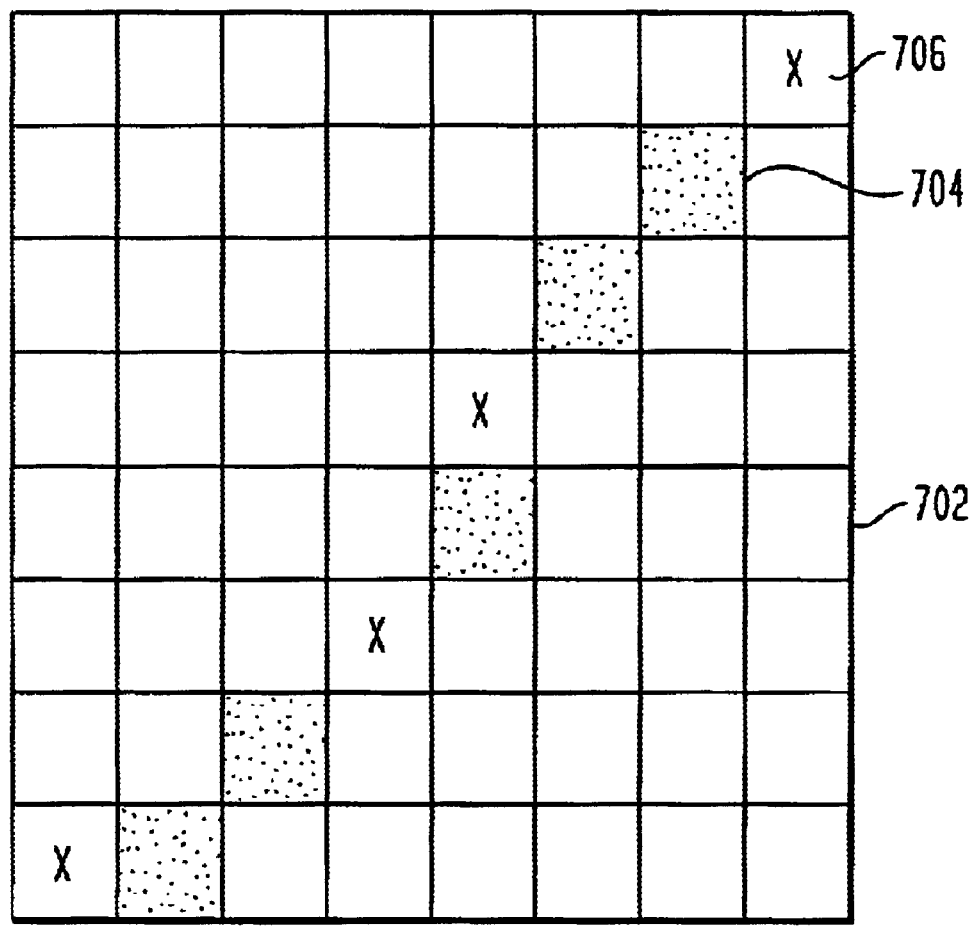

FIGS. 5–7 are exemplary illustrations of a sequence of steps performed for merging a resulting image (i.e., matrix) with a pre-stored image (i.e., matrix) of the user to form a composite image (i.e., matrix). Particularly according to the present invention, a sliding algorithm of FIG. 5 is implemented for comparing images by processing all corresponding bits of the respective images. It should be noted that the images for the user may likely never be exact, and as such, an approximation filter (i.e., margin of error factor) described herein below with reference to FIG. 6 may advantageously be utilized to improve merging. According to the sliding algorithm of FIG. 5, resulting image 502 is "slid" over the pre-stored image 506. Sliding moves horizontal and vertical edges of resulting image 502 over pre-stored image 506 for comparing the images. That is, where binary bit data at a corresponding point in each image has a value of "1", that value is retained in the composite image; otherwise a value of "0" is utilized for all other cases. For example, in resulting image 502, exemplary bit 503 is "0" and exemplary bit 504 is "1", while in pre-stored image 506, exemplary bits 507 and 508 are "1" (i.e., corresponding respectively to bits 503 and 504 of resulting image 504). Performing a Boolean "AND" operation on exemplary bits 503 and 507 yields a "0" in the composite image, while yielding a "1" in the composite image for exemplary bits 504 and 508. All corresponding bit data of the images are processed until complete. If the Boolean "AND" yields a "0" result for a "1" bit of the pre-stored image 506 (i.e., corresponding bit in resulting image 502 is a "0"), then there is no match between the images. However, if the Boolean "AND" operation yields all "1" bits for every "1" bit of the pre-stored image 506, then there is a match between the images.

FIG. 6 illustrates an approximation filter utilized for merging and comparing the resulting image and the pre-stored image of the user. This filter acts as a margin of error factor to approximate a match between images because it is unlikely that there will be a perfect match between the images. The resulting image 602 of FIG. 6 is appended with "1" bits 606 along bits 604 which form edges of resulting image 402 of FIG. 4(a), thereby representing the margin of error factor used during comparisons. The approximation filter adds 1 to n bits 606 on each side of each bit 604 of resulting image 602. Effectively, the approximation filter creates wider edges or contours for the resulting image 602, which is then used for comparisons against pre-stored images. It should be noted that bits 606 appended by the approximation filter are only used for comparison purposes and are not part of resulting image 602.

FIG. 7 illustrates least squares algorithm for filling in open spaces or breaks in the composite image created during merging, as particularly illustrated in FIGS. 5–6. Once the sliding algorithm of FIG. 6 is complete, there will likely be open spaces (e.g., breaks) 706 in the composite image 702, as particularly illustrated in FIG. 7. Using a simple least squares algorithm, computing device 100 of FIG. 1 may appends "1" bits into open spaces 706 in composite image based on the adjacent bits 704. It should be noted that the appended bits 706 are part of composite image 702, which is stored by computing device 100.

One skilled in the art will readily recognize that while the present invention has been described with regard to computing device 100, a myriad other devices, such as a personal digital assistant ("PDA"), Palm Pilot, cellular or other portable telephone, and the like will benefit from features of the present invention.

While the invention has been particularly shown and described with respect to preferred embodiments thereof, it will be understood by those skilled in the art that the foregoing and other changes in form and details may be made therein without departing from the spirit and scope of the invention, as particularly embodied in the appended claims.

Having thus described our invention, what we claim as new, and desire to secure by Letters Patent is:

1. A method for automatically launching an application in a computing device by authenticating a user via a digital camera associated with said computing device, said method comprising:
(a) obtaining a digital representation of said user via said digital camera;
(b) filtering said digital representation with a digital edge detection algorithm, gradient filter, the output of which is applied to a Laplacian or Gaussian filter to provide accurate edge detection while being run on a low power computer, to produce a resulting digital image;
(c) comparing said resulting digital image to a pre-stored digital image of said user;
(d) retrieving user information including an application to be launched in response to a successful comparison result, said user information being associated with said pre-stored digital image of said user; and
(e) launching said application.

2. The method according to claim 1, further comprising a step of: aligning said user in relation to said computing device for obtaining a digital representation of said user.

3. The method according to claim 1, further comprising a step of: centering said resulting image with respect to a frame provided in said computing device.

4. The method according to claim 1, said comparing step further comprising a step of: sliding vertical and horizontal edges of said resulting image over said pre-stored image for enabling said comparing.

5. The method according to claim 1, wherein said resulting image and said pre-stored image for said user are binary matrices.

6. The method according to claim 1, wherein said pre-stored digital image of said user is stored in a database on said computing device.

7. The method according to claim 1, wherein said application is an e-mail client.

8. The method according to claim 7, said launching step further comprising a step of: logging into said e-mail client by utilizing user information including username and password associated with said user.

9. The method according to claim 7, further comprising a step of:
automatically retrieving one or more e-mail messages from said e-mail client for said user; and
displaying said one or more e-mail messages to said user via a display.

10. The method according to claim 1, further comprising a step of: sensing said user in proximity to said computing device for obtaining said digital representation of said user.

11. The method according to claim 1, wherein said user interacts via an interface with sad computing device for obtaining said digital representation of said user.

12. The method according to claim 1, wherein said pre-stored digital image for said user is obtained from a pre-existing digital representation of said user filtered by an edge detection algorithm.

13. The method according to claim 1, wherein said edge detection algorithm is a one bit per pixel edge detection algorithm.

14. The method according to claim 13, wherein said one bit per pixel edge detection algorithm is a Sobel operator.

15. The method according to claim 1, wherein said filtering step further comprises a step of: filtering said resulting digital image with a second edge detection algorithm which is selected from the group consisting of: a Laplacian filter; and a Gaussian filter.

16. The method according to claim 1, wherein in response to said successful match, user information corresponding to said user including user's name is displayed to said user on a visual display.

17. The method according to claim 1, wherein if no match is found for said user, said method further comprising the steps of:
prompting said user to enter user information associated with said pre-stored image of said user; and
launching said application in response to a successful match of entered user information to user information associated with said pre-stored image of said user.

18. The method according to claim 1, said method further comprising a step of: updating said pre-stored digital image of said user by merging said pre-stored digital image with said resulting digital image to generate a composite image.

19. The method according to claim 18, wherein said composite image is generated by taking an arithmetical mean of said pre-stored digital image and said resulting digital image.

20. The method as claimed in claim 18, further comprising a step of: processing said composite image with a least squares algorithm for improving definition of edges in said composite image.

21. The method according to claim 1, further comprising a step of:
prompting said user to confirm user information associated with said pre-stored digital image in response to said successful match of said user.

22. The method according to claim 1, wherein the gradient filter detects edges by identifying intensities in first-order derivatives in orthogonal directions of the image, and the Laplacian or Gaussian filter detects edges by identifying zero crossings in second order derivatives of the image.

23. A system for automatically launching an application in a computing device by authenticating a user via a digital camera associated with said computing device, said method comprising:
(a) a mechanism for obtaining a digital representation of said user via said digital camera;
(b) a mechanism for filtering said digital representation with an digital edge detection algorithm, gradient filter, the output of which is applied to a Laplacian or Gaussian filter to provide accurate edge detection while being run on a low power computer, to produce a resulting digital image;
(c) a mechanism for comparing said resulting digital image to a pre-stored digital image of said user; and
(d) a mechanism for retrieving user information including an application to be launched in response to a successful comparison result, said user information being associated with said pre-stored digital image of said user; and
(e) a mechanism for launching said application.

24. The system according to claim 23, wherein said computing device is connected to a communications network.

25. The system according to claim 23, wherein said computing device is incorporated into a household appliance or a security appliance.

26. The system according to claim 23, wherein said application is an e-mail client.

27. The method according to claim 23, further comprising a mechanism for aligning said user in relation to said computing device for obtaining a digital representation of said user.

28. The method according to claim 23, further comprising a mechanism for centering said resulting image with respect to a frame provided in said computing device.

29. The system according to claim 23, further comprising a mechanism for logging into said e-mail client by utilizing username and password associated with said user.

30. The system according to claim 23, said system further comprising:
a mechanism for retrieving one or more e-mail messages from said e-mail client for said user in response to launching of said e-mail client; and
a mechanism for displaying said one or more e-mail messages to said user via a display.

31. The method according to claim 23, further comprising a mechanism for sensing said user in proximity to said computing device for obtaining said digital representation of said user.

32. The system according to claim 23, wherein if no match is found for said user, said system further comprising:
a mechanism for prompting said user to enter user information associated with said pre-stored image of said user; and
a mechanism for launching said application in response to a successful match of entered user information to user information associated with said pre-stored image of said user.

33. The system according to claim 23, said system further comprising:
a mechanism for updating said pre-stored digital image of said user by merging said pre-stored digital image with said resulting digital image into a composite image.

34. The system according to claim 23, wherein the gradient filter detects edges by identifying intensities in first-order derivatives in orthogonal directions of the image, and the Laplacian or Gaussian filter detects edges by identifying zero crossings in second order derivatives of the image.

35. A program storage device readable by a machine, tangibly embodying a program of instructions, executable by said machine to perform method steps for automatically launching an application in a computing device by authenticating a user via a digital camera associated with said computing device, said method steps comprising:
(a) obtaining a digital representation of said user via said digital camera;
(b) filtering said digital representation with an digital edge detection algorithm, gradient filter, the output of which is applied to a Laplacian or Gaussian filter to provide accurate edge detection while being run on a low power computer, to produce a resulting digital image;
(c) comparing said resulting digital image to a pre-stored digital image of said user;
(d) retrieving user information including an application to be launched in response to a successful comparison result, said user information being associated with said pre-stored digital image of said user; and
(e) launching said application.

36. The program storage device according to claim 35, wherein the gradient filter detects edges by identifying intensities in first-order derivatives in orthogonal directions of the image, and the Laplacian or Gaussian filter detects edges by identifying zero crossings in second order derivatives of the image.

* * * * *